United States Patent
Barczak et al.

(10) Patent No.: US 8,379,019 B2
(45) Date of Patent: Feb. 19, 2013

(54) FAST TRIANGLE REORDERING FOR VERTEX LOCALITY AND REDUCED OVERDRAW

(75) Inventors: Joshua D. Barczak, Milford, MA (US);
Diego F. Nehab, Seattle, WA (US);
Pedro V. Sander, Kowloon (HK)

(73) Assignee: Advanced Micro Devices, Inc., Sunnyvale, CA (US)

( * ) Notice: Subject to any disclaimer, the term of this patent is extended or adjusted under 35 U.S.C. 154(b) by 853 days.

(21) Appl. No.: 11/964,517

(22) Filed: Dec. 26, 2007

(65) Prior Publication Data
US 2009/0167758 A1    Jul. 2, 2009

(51) Int. Cl.
*G06T 15/40* (2011.01)
(52) U.S. Cl. ........ 345/421; 345/422; 345/557; 345/619; 345/620
(58) Field of Classification Search .................. 345/419, 345/421
See application file for complete search history.

(56) References Cited

U.S. PATENT DOCUMENTS

| | | | | |
|---|---|---|---|---|
| 6,426,747 | B1* | 7/2002 | Hoppe et al. | 345/419 |
| 6,573,895 | B1* | 6/2003 | Carter et al. | 345/441 |
| 7,310,098 | B2* | 12/2007 | Ohba | 345/428 |
| 7,372,471 | B1* | 5/2008 | Hutchins | 345/611 |
| 7,391,418 | B2* | 6/2008 | Pulli et al. | 345/421 |
| 7,589,722 | B2* | 9/2009 | Morein | 345/426 |
| 7,688,319 | B2* | 3/2010 | Miller | 345/422 |
| 8,305,398 | B2* | 11/2012 | Finger et al. | 345/629 |
| 2001/0012018 | A1* | 8/2001 | Hayhurst | 345/630 |
| 2004/0222987 | A1* | 11/2004 | Chang et al. | 345/419 |
| 2006/0146049 | A1* | 7/2006 | Pulli et al. | 345/421 |
| 2006/0197773 | A1* | 9/2006 | Kraemer | 345/582 |
| 2007/0103462 | A1* | 5/2007 | Miller | 345/421 |
| 2007/0177802 | A1* | 8/2007 | Grabli et al. | 382/187 |
| 2007/0285418 | A1* | 12/2007 | Middler et al. | 345/419 |
| 2008/0018647 | A1* | 1/2008 | Bunnell | 345/426 |
| 2009/0074311 | A1* | 3/2009 | Lee | 382/236 |
| 2010/0080429 | A1* | 4/2010 | Li | 382/131 |

OTHER PUBLICATIONS

Hansong Zhang, Dinesh Manocha, Tom Hudson, and Kenneth E. Hoff, III. 1997. Visibility culling using hierarchical occlusion maps. In Proceedings of the 24th annual conference on Computer graphics and interactive techniques (SIGGRAPH '97). ACM Press/Addison-Wesley Publishing Co., New York, NY, USA, 77-88. DOI=10.1145/258734.258781 http://dx.doi.org/1.*

Diego Nehab, et al., "Triangle Order Optimization for Graphics Hardware Computation Culling,", Proceedings of the ACM SIGGRAPH Symposium on Interactive 3DGraphics and Games, Redwood City, CA, Mar. 14-17, 2006, pp. 207-211.

Pedro V. Sander, et al., "Fast Triangle Reordering for Vertex Locality and Reduced Overdraw", ACM Transactions on Graphics (Proceedings of SIGGRAPH 2007), 9 pages.

* cited by examiner

*Primary Examiner* — Xiao M. Wu
*Assistant Examiner* — Phi Hoang
(74) *Attorney, Agent, or Firm* — Sterne, Kessler, Goldstein & Fox P.L.L.C.

(57) ABSTRACT

Presented are systems and methods that change the order in which triangles are rendered, to improve post-transform vertex cache efficiency and reduce view-independent overdraw. The resulting triangle orders are orders magnitude faster to compute compared to previous methods. The improvements in processing speed allow such methods to be performed on a model after it is loaded (i.e., when more information on the host hardware is available). Also, such methods can be executed interactively, allowing for re-optimization in case of changes to geometry or topology, which happen often in CAD/CAM applications.

20 Claims, 8 Drawing Sheets

FAST TRIANGLE REORDERING FOR VERTEX LOCALITY AND REDUCED OVERDRAW

BACKGROUND OF THE INVENTION

1. Field of the Invention

The present invention is generally directed to computing operations performed in computing systems, and more particularly directed to graphics processing tasks performed in computing systems.

2. Background Art

A graphics processing unit (GPU) is a complex integrated circuit that is specially designed to perform graphics processing tasks. A GPU may, for example, execute graphics processing tasks required by an end-user application, such as a video game application. In such an example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

Many GPUs use a technique known as pipelining to execute the instructions. Pipelining enables a GPU to work on different steps of an instruction at the same time, and thereby take advantage of parallelism that exists among the steps needed to execute the instruction. As a result, a GPU can execute more instructions in a shorter period of time.

Modern rendering pipelines accept input in a variety of formats, but the most widely used representation for geometry is based on vertex and index buffers. A vertex buffer provides 3D coordinates and attributes for a set of vertices. The index buffer defines a set of triangles, each given by the triad of indices of its vertices in the vertex buffer.

As each triangle is processed for rendering, referenced vertices are processed by a vertex shader in an operation that can be computationally expensive. The cost comes from a combination of the bandwidth required to load the data associated with each vertex (e.g., position, normal, color, texture coordinates, etc), and the instructions required to process them (e.g., transform and lighting). Applications whose rendering cost is dominated by this bottleneck are said to be vertex-bound.

Another potential bottleneck exists during rasterization. Each generated pixel is processed by a pixel shader, which might perform expensive operations in the process of computing the final pixel color. Once again, the cost comes from bandwidth associated with texture lookups and from the arithmetic logic unit (ALU) instructions executed by the GPU. When this cost dominates the total rendering cost, applications are said to be pixel-bound (or fill-bound). The growing complexity of per-pixel lighting effects has progressively increased concerns with this bottleneck.

Modern GPUs employ a variety of optimizations that attempt to avoid unnecessary memory references and computations. Two such optimizations are the post-transform vertex cache (used during vertex processing) and early Z-culling (used during pixel processing).

The post-transform vertex cache holds a small number of transformed vertices in a first-in first-out (FIFO) queue. When a triangle references a vertex found in the cache, results are reused directly, without any external data transfers or further processing required. An average cache miss ratio (ACMR) can be greatly reduced if triangles are ordered to increase vertex reference locality. The ACMR in turn has a strong impact on the frame rate of vertex-bound applications. Many algorithms have therefore been proposed to generate low-ACMR triangle orders.

Early Z-culling is an optimization by which the GPU tests the depth of each pixel against the Z-buffer before executing its pixel shader. If the depth is such that the results would be discarded, no additional work is performed. This optimization is most effective when there is little overdraw. Overdraw can be defined as the ratio between the total number of pixels passing the depth test and the number of visible pixels (a ratio of 1 means no overdraw).

Currently available algorithms (such as the Direct3DX library from Microsoft Corp. and the NvTriStrip library from NVIDIA® Corp.) re-order the faces and vertices of a mesh to maximize coherence in the vertex cache. Although these algorithms can reduce vertex shader computations, they do not reduce the amount of overdraw generated by their triangle orderings. Such overdraw is often significant.

Another currently available algorithm generates a static triangle order that (i) does not significantly harm the coherence in the post-transform vertex cache, and (ii) produces low overdraw. This algorithm is described in Nehab, D., Barczak, J., and Sander, P. V., "Triangle Order Optimization for Graphics Hardware Computation Culling," in *Proceedings of the ACM SIGGRAPH Symposium on Interactive* 3D *Graphics and Games*, 2006, pp. 207-211, the entirety of which is incorporated by reference herein. Although this algorithm can produce low overdraw, this algorithm works by repeatedly rendering the mesh in order to measure overdraw, and is therefore quite slow and only suitable for offline preprocessing of static geometries.

Given the foregoing, what is needed are improved systems and methods that generate a triangle order that rearrangess the post-transform vertex cache and reduces overdraw. Desirably, such systems and methods would be fast enough to be used at application load time. More desirably, such systems and methods would be executable at run-time, and therefore suitable for dynamic geometries and topologies.

BRIEF SUMMARY OF THE INVENTION

The present invention relates to computing a view-independent triangle ordering for a mesh. This view-independent triangle ordering reduces pixel overdraw during rendering, while also providing good vertex cache coherence. Unlike previous techniques, the view-independent triangle ordering is not required to render the mesh to measure overdraw. As a result, view-independent triangle reordering performed in accordance with an embodiment of the present invention runs significantly faster than previous methods, while providing results which are at least as good. Thus, a view-independent triangle reordering implemented in accordance with an embodiment of the present invention is suitable for use at application load time, or even at run time on dynamic geometries.

An embodiment of the present invention provides a computer-based method, implemented at runtime, for reducing overdraw during rendering of a mesh. The method includes reordering triangles of the mesh to reduce cache misses. The reordered triangles are grouped into clusters. A rendering sequence is determined for the clusters based on a view-independent occlusion potential. Then, the clusters are rendered according to the rendering sequence.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
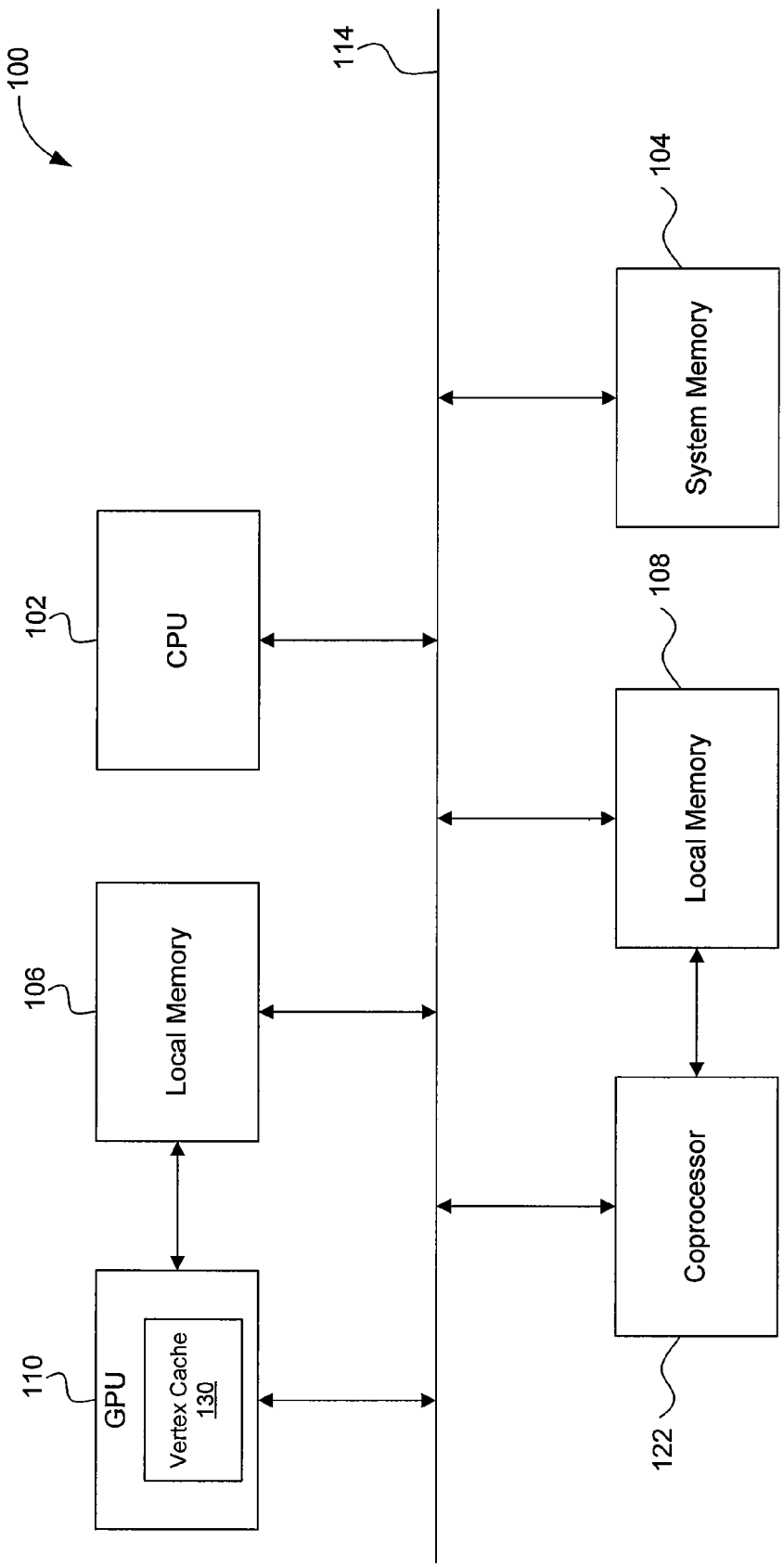
FIG. 1 depicts a block diagram illustrating an example computer system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present invention provides systems and methods for quickly implementing a view-independent triangle reordering of a mesh to provide vertex locality and reduce overdraw. In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An embodiment of the present invention provides a fast technique for computing a view-independent triangle ordering for a mesh, which reduces pixel overdraw during rendering, while also providing good vertex cache coherence. This technique is more general and runs significantly faster than conventional approaches, while producing results that are comparable to the conventional approaches.

In an embodiment, a view-independent triangle reordering technique is used with dynamic geometry (such as games, computer aided design (CAD) applications, and computer aided manufacturing (CAM) applications). In an alternative embodiment, this view-independent triangle reordering technique is implemented as a preprocessing step to rearrange meshes prior to rendering. When used in this alternative embodiment, applications can obtain higher rendering performance in pixel limited situations, with no runtime cost.

II. An Example System

FIG. 1 depicts a block diagram illustrating an example computing system 100 that implements a view-independent triangle reordering technique in accordance with an embodiment. Computing system 100 includes a central processing unit (CPU) 102, a graphics processing unit (GPU) 110, and may optionally include a coprocessor 122. In addition, computing system 100 includes a system memory 104 that may be accessed by CPU 102, GPU 110, and coprocessor 122. GPU 110 and coprocessor 122 communicate with CPU 102 and system memory 104 over a bus 114. Bus 114 may be any type of bus used in computer systems, including a peripheral component interface (PCI) bus, an accelerated graphics port (AGP) bus, and a PCI Express (PCIE) bus.

GPU 110 and coprocessor 122 assist CPU 102 by performing certain special functions, usually faster than CPU 102 could perform them in software. Coprocessor 122 may comprise, but is not limited to, a floating point coprocessor, a GPU, a networking coprocessor, and other types of coprocessors and processors as would be apparent to a person skilled in the relevant art(s). In alternative embodiments, GPU 110 may be integrated into a chipset and/or CPU 102.

GPU 110 includes a vertex cache 130. Vertex cache 130 holds a relatively small number of transformed vertices in a FIFO queue. When a triangle references a vertex found in vertex cache 130, results are reused directly, without any external data transfers or further processing required. In this way, GPU 110 can avoid unnecessary computation and memory references, and thereby perform graphics processing tasks more quickly and efficiently.

Computing system 100 further includes local memory 106 and local memory 108. Local memory 106 is coupled to GPU 110 and also coupled to bus 114. Local memory 108 is coupled to coprocessor 122 and also coupled to bus 114. Local memories 106 and 108 are available to GPU 110 and coprocessor 122, respectively, in order to provide faster access to certain data (such as data that is frequently used) than would be possible if the data were stored in system memory 104. Local memories 106 and 108 may include, for example, a frame buffer, a texture buffer, a vertex buffer, an index buffer, and the like.

In an embodiment, GPU 110 and coprocessor 122 decode instructions in parallel with CPU 102 and execute only those instructions intended for them. In another embodiment, CPU 102 sends instructions intended for GPU 110 and coprocessor 112 to respective command buffers.

Figure 2:
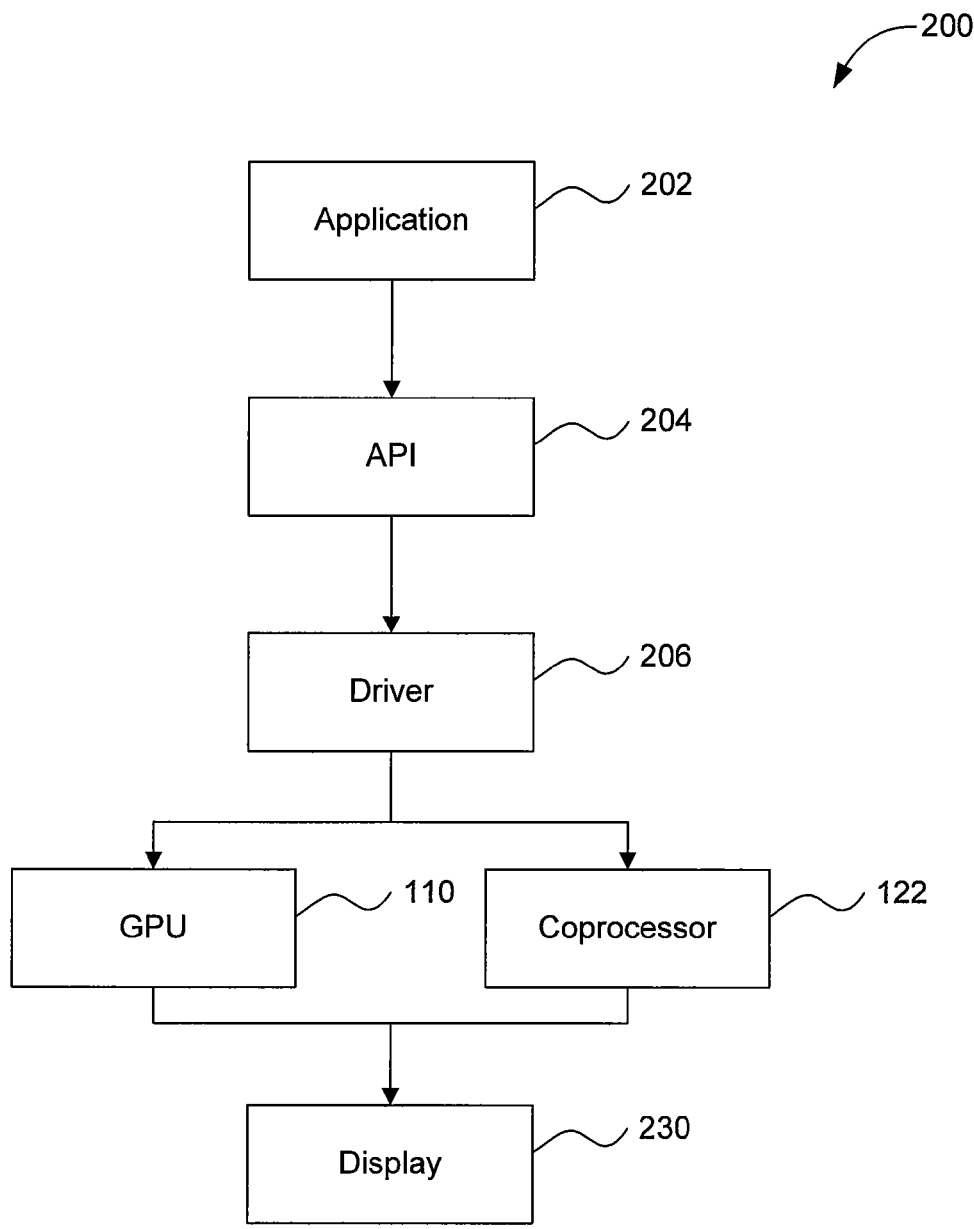
FIG. 2 depicts a block diagram illustrating an example work flow for processing graphics.

FIG. 2 depicts a block diagram 200 of an example functional block diagram of a system for performing graphics processing on GPU 110, including performing a view-independent triangle reordering in accordance with an embodiment of the present invention. Block diagram 200 includes various software elements, such as an application 202, an API 204, and a driver 206, that are executed on a host computing system (such as computing system 100) and interact with graphics hardware elements (such as GPU 110 and/or coprocessor 122) to perform graphics processing tasks for output to a display 230.

Application 202 is an end-user application that requires graphics processing capability (such as, for example, a video game application, a CAD application, a CAM application, or the like). Application 202 communicates with API 204.

API 204 is an intermediary between application software, such as application 202, and graphics hardware on which the application software runs. With new chipsets and entirely new hardware technologies appearing at an increasing rate, it is difficult for application developers to take into account, and take advantage of, the latest hardware features. It is also increasingly difficult for application developers to write applications specifically for each foreseeable set of hardware. API 204 prevents application 202 from having to be too hardware-specific. Application 202 can output graphics data and commands to API 202 in a standardized format, rather than directly to the hardware (e.g., GPU 110 and/or coprocessor 122). API 204 may comprise a commercially available API (such as DirectX® or OpenGL®), a custom API, or the like. In an embodiment, a custom API includes a library of functions to cause a GPU to perform a view-independent triangle reordering in accordance with an embodiment of the present invention. API 204 communicates with driver 206.

Driver 206 is typically written by the manufacturer of the graphics hardware, and translates standard code received from API 204 into native format understood by the graphics hardware, such as GPU 110 and coprocessor 122. Driver 206 also accepts input to direct performance settings for the graphics hardware. Such input may be provided by a user, an application or a process. For example, a user may provide input by way of a user interface (UI), such as a graphical user interface (GUI), that is supplied to the user along with driver 206.

In an embodiment, driver 206 provides an extension to a commercially available API. The extension provides application 202 with a library of functions for causing a GPU to perform a view-independent triangle reordering in accordance with an embodiment of the present invention. Because the library of functions is provided as an extension, a commercially-available API may be used in accordance with an embodiment of the present invention.

Driver 206 communicates with GPU 110 and/or coprocessor 122.

GPU 110 and coprocessor 122 may be graphics chips that each includes a shader and other associated hardware for performing graphics processing. In an embodiment, GPU 110 and/or coprocessor 122 implement a view-independent triangle reordering technique, which is embodied in software and stored in driver 206 and/or API 204.

When rendered frame data processed by GPU 110 and/or coprocessor 122 is ready for display it is sent to display 230. Display 230 comprises a typical display for visualizing frame data as would be apparent to a person skilled in the relevant art(s).

It is to be appreciated that block diagram 200 is presented for illustrative purposes only, and not limitation. Other implementations may be realized without deviating from the spirit and scope of the present invention.

III. Example Operation

Figure 3:
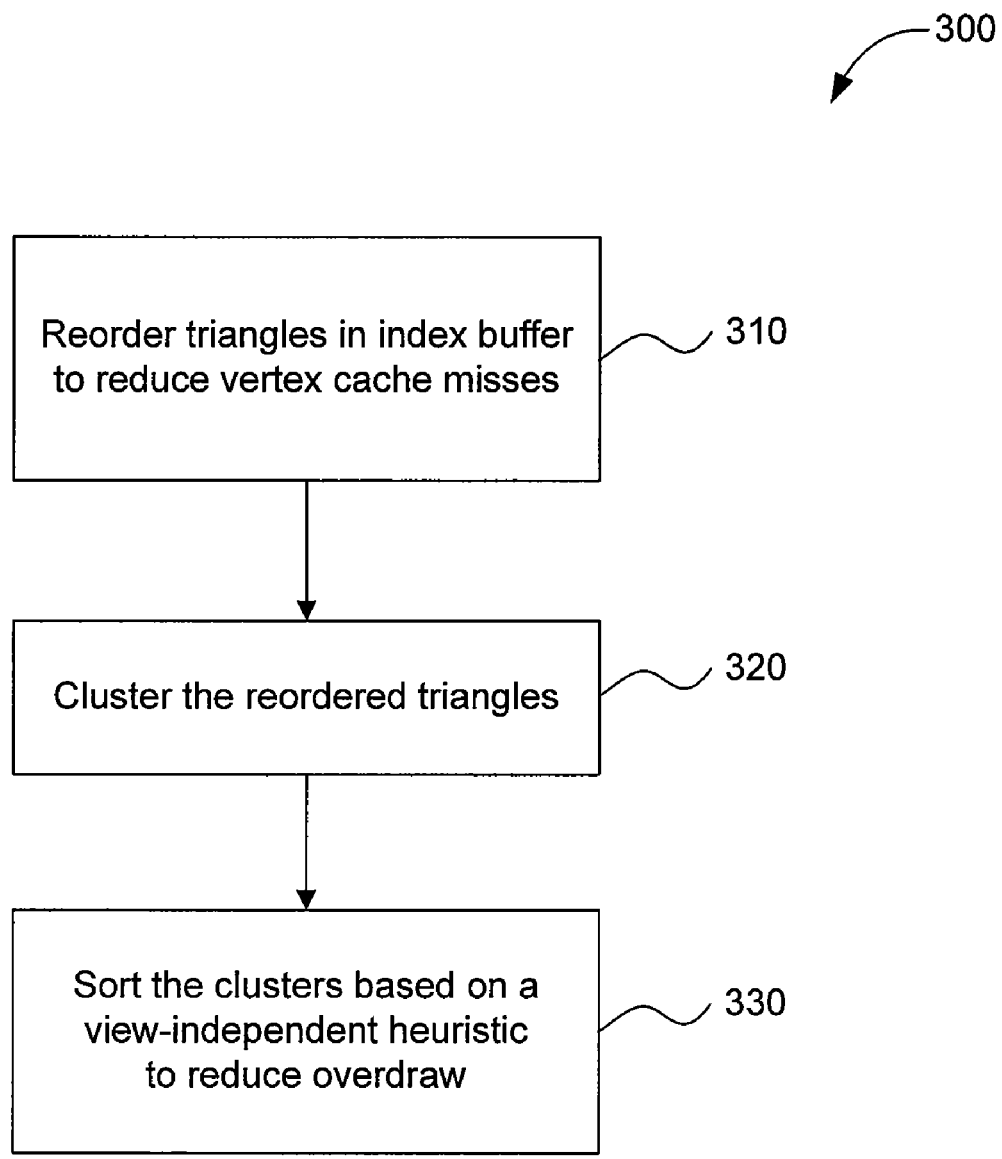
FIG. 3 depicts a block diagram illustrating an example method for reordering triangles for vertex locality and reduced overdraw in accordance with an embodiment of the present invention.

FIG. 3 depicts a block diagram illustrating an example view-independent triangle reordering technique 300 for optimizing the order in which triangles are rendered in accordance with an embodiment of the present invention. As alluded to above and described in more detail below, technique 300 may be embodied in software and stored in driver 206 and/or API 204, and may be implemented by GPU 110 and/or coprocessor 122.

Referring to FIG. 3, technique 300 begins at a step 310 in which triangles in an index buffer are reordered to reduce vertex cache misses. The step of reordering the index buffer is referred to herein as the "tipsy strip" technique, and is described in more detail below in Section III.A.

In a step 320, the reordered triangles are grouped into clusters. Clusters are generated on hard boundaries and (optionally) soft boundaries, as briefly described below and described in more detail in Section III.B.

Hard boundaries occur on vertex cache flushes. A new cluster is created whenever a vertex cache flush is detected in the index buffer generated by the tipsy strip technique (step 310). These cache flush events can be detected during the execution of the tipsy strip technique (step 310), which results in a faster implementation. Because the cluster boundaries correspond to cache flushes, these clusters can be rendered in any order without changing the ACMR.

Soft boundaries occur when the local ACMR is less than a user-configurable threshold. Because a high cluster count will tend to generate a better reduction in overdraw, the clustering can optionally be refined by splitting clusters until such splitting generates an "unacceptable" ACMR (wherein "unacceptable" corresponds to a user-configurable parameter, a pre-defined or pre-determined parameter, or automatically and potentially dynamically calculated parameter as described in further detail below).

In a step 330, a view-independent cluster sorting is performed to reduce overdraw. Unlike previous approaches (which sorted clusters by explicitly measuring overdraw), the present invention uses a simple sorting heuristic which tends to order clusters from the outside in. Although this approach is slightly less effective than measurement-based approaches, this approach is much simpler to implement and is up to an order of magnitude faster to compute. The view-independent cluster sorting of step 330 is described in more detail below in Section III.C.

A. Post-Transform Vertex Cache Optimization

The reordering step 310 of technique 300 (FIG. 3) is now described in more detail.

Figure 5:
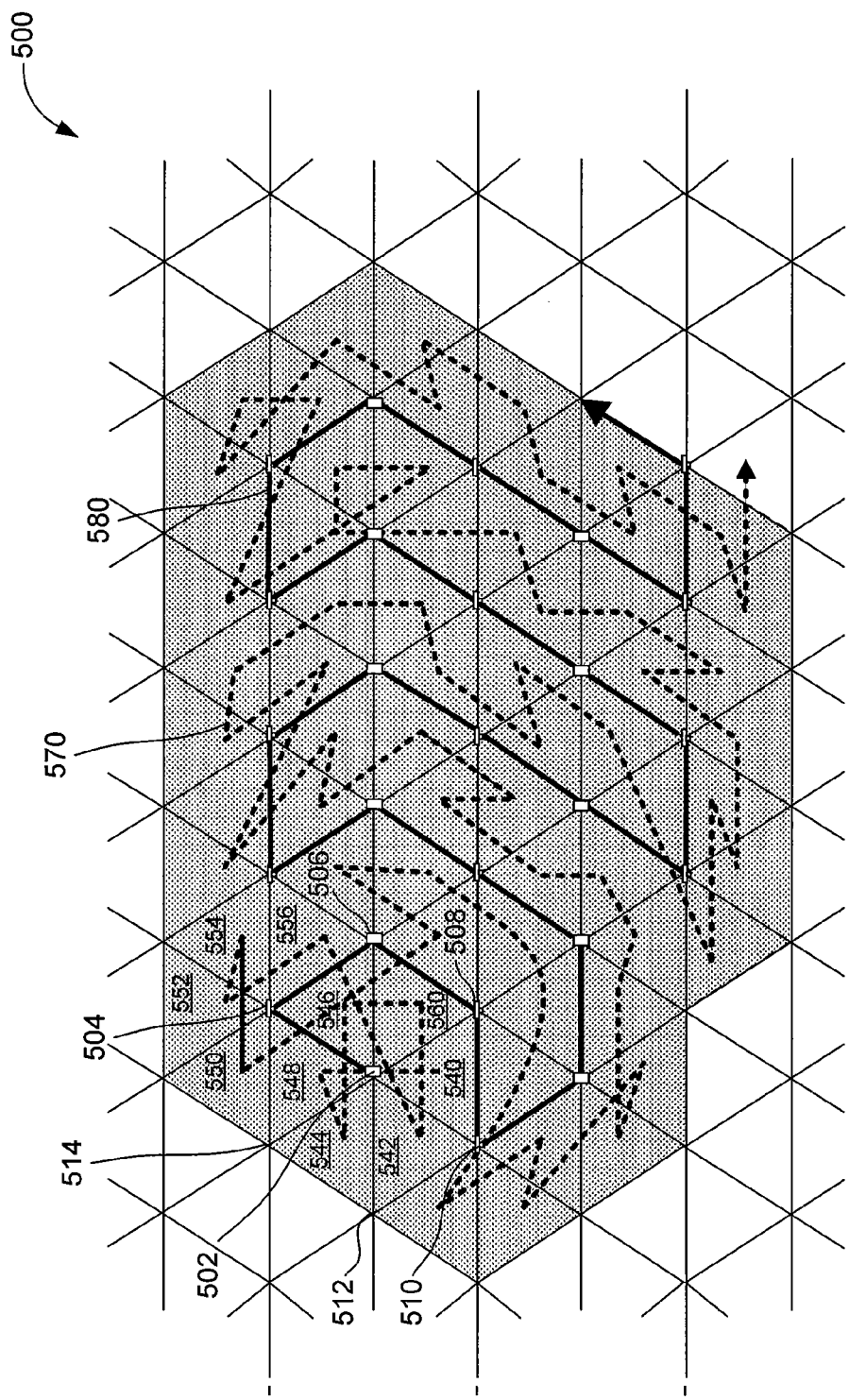
FIG. 5 depicts an example order in which triangles of a mesh are issued in accordance with an example post-transform vertex cache optimization of the present invention.

The basic idea is to cluster triangles around common vertices, much like triangle fans. Triangles are ordered randomly within each fan. Interestingly, within a small neighborhood, the relative order in which the triangles are generated does not matter, as long as the post-transform vertex cache is large enough to hold the entire neighborhood (e.g., 7 vertices in regular meshes). Accordingly, the triangles are not sorted before they are issued. This allows the triangles to be issued in an order that is locally random, or tipsy. For example, solid line 580 of FIG. 5 depicts an example order in which vertices are selected to be fanned, and dashed line 570 of FIG. 5 depicts an example order in triangles are issued, as explained in more detail below.

Figure 4:
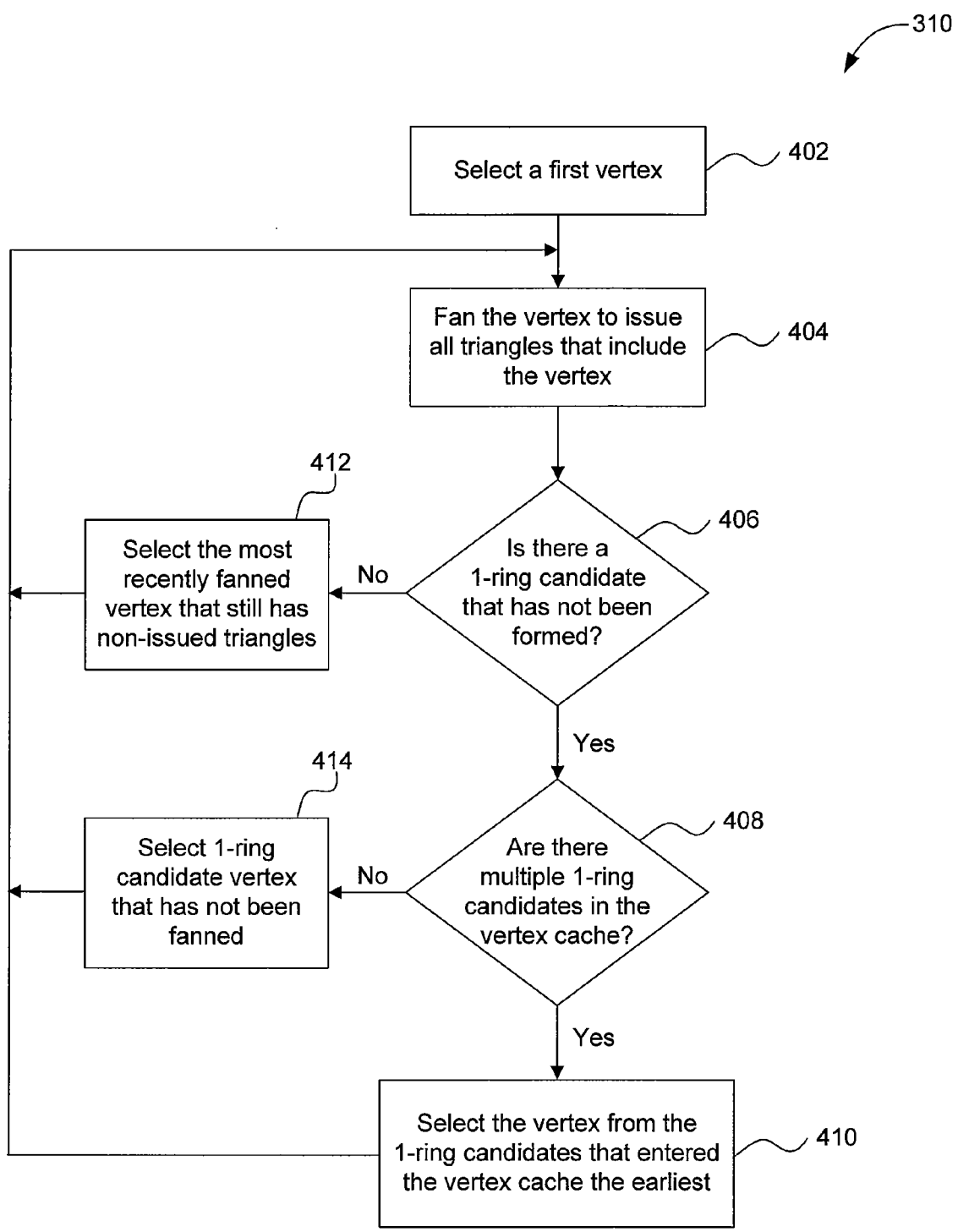
FIG. 4 depicts a block diagram illustrating an example post-transform vertex cache optimization in accordance with an embodiment of the present invention.

FIG. 4 depicts details of the reordering step 310 in accordance with an embodiment of the present invention. Reordering step 310 functions to reorder triangles of the index buffer to rearrange the vertex cache (such as vertex cache 130 of FIG. 1). To better understand the operations depicted in FIG. 4, reference is made to the example mesh 500 depicted in FIG. 5.

Block diagram 400 begins at step 402 in which a first vertex is selected. The first vertex may be selected based on the order it was stored in the index buffer. For the example depicted in FIG. 5, vertex 502 of mesh 500 is the first vertex that is selected.

In a step 404, the vertex is fanned to issue all triangles that include the vertex. Referring to example mesh 500 of FIG. 5, there are six triangles that include vertex 502: a triangle 540, a triangle 542, a triangle 544, a triangle 548, a triangle 546, and a triangle 560. In the example of FIG. 5, vertex 502 is fanned to issue triangles in the following order: (1) triangle 540, (2) triangle 548, (3) triangle 544, (4) triangle 546, (5) triangle 560, and (6) triangle 542.

In a step 406, it is determined whether there is a 1-ring candidate that has not been fanned. The 1-ring candidates of a fanned vertex comprise the other vertices of issued triangles which include the fanned vertex. Referring to FIG. 5, the 1-ring candidates of vertex 502 comprise vertices 504, 506, 508, 510, 512, and 514.

If it is determined in step 406 that there are 1-ring candidates that have not been fanned, it is determined whether there are multiple 1-ring vertices in the vertex cache, in accordance with a step 408. An example manner for determining whether a vertex is in the vertex cache is described below with reference to the example pseudo-code.

If, however, in step 406, it is determined that there are no 1-ring candidates that have not been fanned (which is referred to herein as a dead-end), then the most recently referenced vertex that still has non-issued triangles is selected, as illustrated in a step 412. In many cases, this vertex is still in the cache. Therefore, this choice is better than picking an arbitrary vertex based on the input order alone, which is done only as a last resort.

If, in step 408, it is determined that there are multiple 1-ring candidates in the vertex cache, then the vertex from the 1-ring candidates that entered the cache the earliest is selected, as illustrated in a step 410. The concept of determining when a vertex enters the cache is described below with reference to the example pseudo-code.

If, however, in step 408, it is determined that there are not multiple 1-ring candidates in the vertex cache, then the 1-ring candidate that has not been fanned is selected, as illustrated in a step 414.

In terms of example mesh 500 of FIG. 5, vertex 504 is the second vertex that is selected to be fanned, as illustrated by solid line 580. As illustrated in FIG. 5, there are four triangles that include vertex 504 that were not issued during the fanning of vertex 502—namely, triangles 550, 552, 554, and 556. As illustrated by dashed line 580, these four triangles are issued in the following order: (1) triangle 550, (2) triangle 554, (3) triangle 552, and (4) triangle 556.

After issuing these four triangles, a new fanning vertex is selected, which in the example of FIG. 5 is vertex 506. This technique continues until all triangles of mesh 500 are issued.

Set forth below is example pseudo-code corresponding to the steps illustrated in FIG. 4, followed by a discussion of the example pseudo-code.

```
Tipsify(I, k): O
  A = Build-Adjacency(I)           Vertex-triangle adjacency
  L = Get-Triangle-Counts(A)       Per-vertex live triangle counts
  C = Zero(Vertex-Count(I))        Per-vertex caching time
                                   stamps
  D = Empty-Stack( )               Dead-end vertex stack
  E = False(Triangle-Count(I))     Per triangle emitted flag
  O = Empty-Index-Buffer( )        Empty output buffer
  f = 0                            Arbitrary starting vertex
  s = k+1, i = 1                   Time stamp and cursor while f >= 0                     For all valid fanning vertices
    N = Empty-Set( )               1-ring of next candidates
    foreach Triangle t in Neighbors(A, f)
      if !Emitted(E,t)
        for each Vertex v in t
          Append(O,v)              Output vertex
          Push(D,v)                Add to dead-end stack
          Insert(N,v)               Register as candidate
          L[v] = L[v]-1            Decrease live triangle count
          if s-C[v] > k             If not in cache
            C[v] = s               Set time stamp
            s = s+1                Increment time stamp
        E[t] = true                Flag triangle as emitted
    Select next fanning vertex
    f = Get-Next-Vertex(I,i,k,N,C,s,L,D)
  return O
  Get-Next-Vertex(I,i,k,N,C,s,L,D)
    n = -1, p = -1                 Best candidate and priority
    foreach Vertex v in N
      if L[v] > 0                  Must have live triangles
        p = 0                      Initial priority
        if s-C[v]+2*L[v] <= k      In cache even after fanning?
          p = s-C[v]               Priority is position in cache
        if p > m                   Keep best candidate
          m = p
          n = v
    if n == -1                     Reached a dead-end?
      n = Skip-Dead-End(L,D,I,i)   Get non-local vertex
    return n
  Skip-Dead-End(L,D,I,i)
    while !Empty(D)                Next in dead-end stack
      d = Pop(D)
      if L[d] > 0                  Check for live triangles
        return d
    while i < Vertex-Count(I)      Next in input order
      i = i + 1                    Cursor sweeps list only once
      if L[i] > 0                  Check for live triangles
        return i
    return -1                      We are done!
```

The function Tipsify( ) receives an index buffer as input, and outputs a rearranged index buffer containing the same triangles.

The first step in the pseudo code is to build the sets of all triangles adjacent to each vertex. Build-Adjacency( ) can be efficiently implemented with three linear passes over the index buffer (much like the counting-sort technique). On the first pass, the number of occurrences of each vertex is counted. On the second pass, a running sum is computed, which is used to produce an offset map. On the third pass, an array with the triangle lists is produced.

Tipsify( ) also uses an array L that maintains, for each vertex, the number adjacent live triangles—i.e., the number of neighboring triangles that have not yet been written to the output buffer. Init-Live-Triangles( ) initializes this array directly from the adjacency structure A.

The remaining required data structures include an array C, a time-stamp counter s, a dead-end stack D, and an array E. The array C holds, for each vertex, the time at which it last entered the cache. The concept of time is given by a time-stamp counter s that is incremented each time a vertex enters the cache. Given this information and the current time stamp, the position of a vertex v in the FIFO cache can be computed in constant time. To do so, the current time is subtracted by the time at which the vertex v entered the cache to yield s-C[v]. The dead-end stack D helps the technique recover from the absence of good next candidates within the 1-ring of the current fanning vertex. Finally, the array E flags triangles that have already been emitted.

After arbitrarily initializing the fanning vertex f to the first input vertex, the technique enters its main loop. This loop will eventually issue all triangles in the input, by selecting an efficient sequence of fanning vertices. The loop itself takes care of minor bookkeeping. The interesting part of the technique is captured by the function Get-Next-Vertex( ).

Get-Next-Vertex( ) considers all 1-ring candidates and selects the best next fanning vertex based on whether the vertex will be in the cache. The following example equation is used to determine whether a vertex v will be located in the cache:

$$s-C[v]+2*L[v]>k \quad (1)$$

wherein s is the time-stamp counter, C[v] is the array that holds the time at which vertex v entered the cache, L[v] is the number of live triangles for vertex v, and k is the size of the cache. As mentioned above, the position of a vertex v in the cache is given by s-C[v]. The number of live triangles for vertex v is given by L[v]. If vertex v is fanned, each triangle would at most generate two cache misses. This would cause v to be shifted into position s−C[v]+2*L[v] in the cache. Therefore, to remain in the cache it is sufficient that this position is greater than the size k of the cache, i.e., that the inequality in (1) is satisfied. Of the candidates passing this test, the vertex that entered the cache the earliest is chosen, because this vertex is still useful, but is about to be evicted from the cache.

When there are no suitable candidates, a dead-end is reached and the technique may jump to a non-local vertex. This is the task of the Skip-Dead-End( ) function. To increase the chances of restarting from a vertex that is still in the cache, stack D keeps track of recently issued vertices. Stack D can be efficiently searched, in reverse order, to find a vertex with live triangles. If the dead-end stack D is exhausted without producing a fanning vertex, the next vertex with live triangles is selected in input order.

Unlike most previous approaches, the reordering technique provided by this pseudo code runs in time that is linear with respect to the input size (i.e., the number of triangles in the mesh). The running time does not depend on the target cache size k. This is clear from the fact that k only appears in constant-time expressions.

For the run-time analysis, the cost of Get-Next-Vertex( ) can be excluded. In that case, the main loop in Tipsify( ) runs in time O(t), where t is the number of input triangles. Each vertex is fanned at most once, and each fanning operation only visits the vertex's neighboring triangles. Therefore, each triangle is visited at most three times (one for each of its vertices). Furthermore, for each visited triangle, all operations are constant-time.

As for Get-Next-Vertex( ), throughout its entire lifetime, the dead-end stack D receives only 3t indices. This is because each triangle is emitted only once, and each triangle pushes only its three vertex indices on the dead-end stack D. Therefore, the first loop in Get-Next-Vertex( ) can only be executed 3t times. With respect to the second loop, index i is incremented, but it is never decremented. Therefore, this loop also can only be executed 3t times.

After an initial spiraling pattern, the reordering technique converges to a zig zag pattern, as illustrated for example in FIG. 5. Such a zig zag pattern occurs because the fanning sequence tries to follow the previous strip of vertices, since they are still in the cache. Eventually, it reaches a point where the adjacent vertices from the preceding strip are not on the cache. The sequence is then forced to turn around again in order to fan a recently processed vertex that is still in the cache.

Counting the number of issued triangles versus the number of newly transformed vertices at each cycle, the steady state performance of $$\frac{n+2}{2n+2}$$

ACMR is reached. The larger the n, the closer this reordering technique comes to the optimal value of ½.

B. Fast Linear Clustering

The clustering step 320 of technique 300 (FIG. 3) is now described in more detail. As illustrated in FIG. 3, the input to the clustering step 320 is the output of the vertex cache optimization of step 310. The result of the clustering step 320 is to break the sequence of issued triangles from the vertex cache optimization step 310 into contiguous, smaller sub-sequences, in a process referred to herein as fast linear clustering. Each sub-sequence becomes a cluster.

The larger the clusters, the smaller the impact on ACMR when the relative order between the clusters is later reordered (as described in more detail below in Section III.C). Unfortunately, given only a few large clusters, the ordering stage might not have enough freedom to reduce overdraw. Hence, there is a trade-off. The cluster approach of step 320 is to take advantage of the wealth of information produced during the vertex cache optimization process of step 310, and break the model into a multitude of small clusters, carefully delimited not to significantly penalize the vertex cache.

Figure 6:
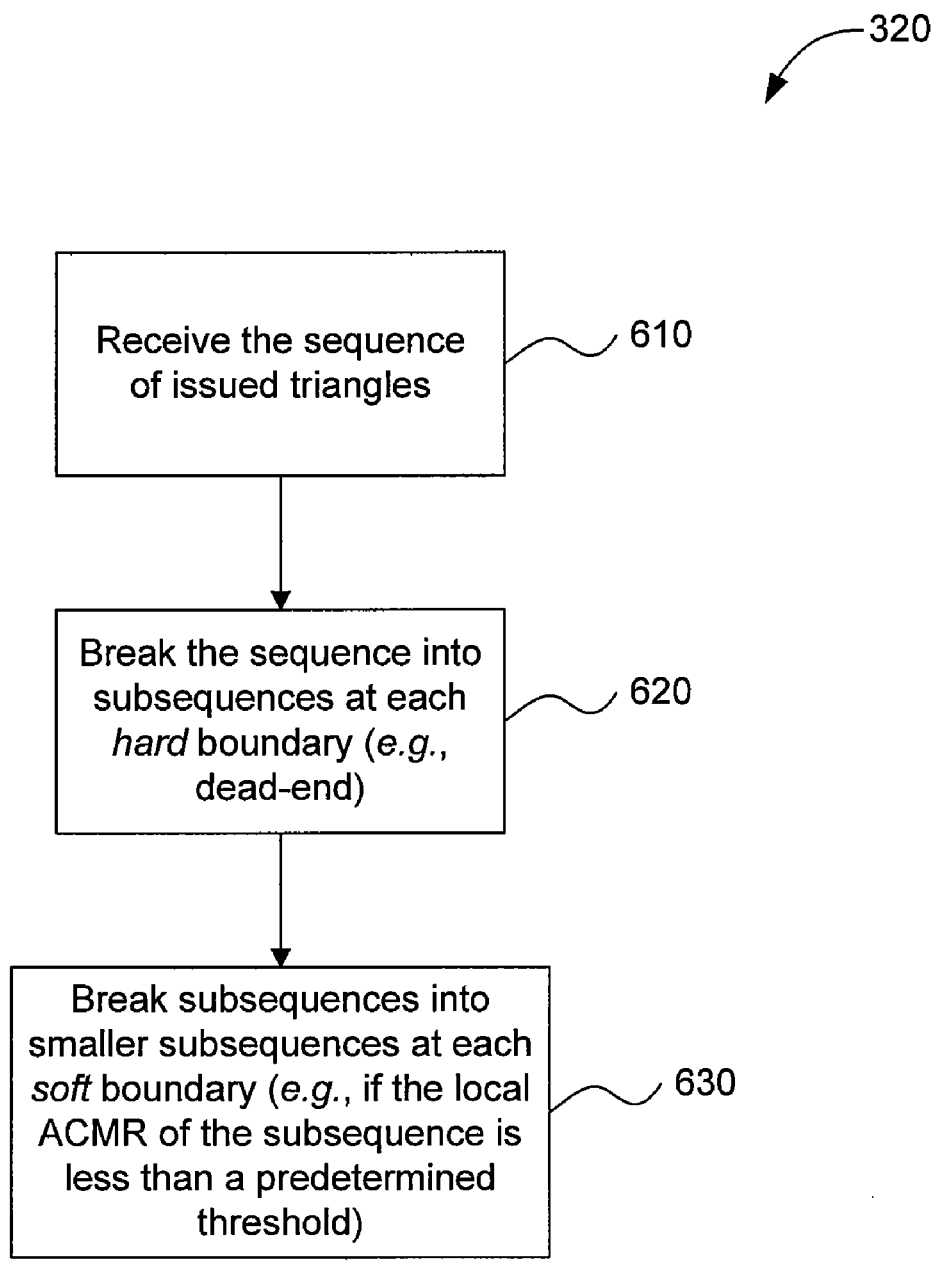
FIG. 6 depicts a block diagram illustrating an example method for clustering issued triangles in accordance with an embodiment of the present invention.

For example, FIG. 6 depicts a block diagram illustrating details of the clustering step 320 in accordance with an embodiment of the present invention. Referring to FIG. 6, in a step 610, the sequence of issued triangles is received. This sequence is the output of the reordering step 310 described above.

In a step 620, the sequence is broken into sub-sequences at each hard boundary. A hard boundary occurs at a vertex cache flush. According to the reordering of step 110, each dead-end results in a path discontinuity. These discontinuities cause the vertex cache to be flushed.

In a step 630, the sub-sequences are broken into smaller sub-sequences if there is a soft boundary. A soft boundary occurs if the following expression is satisfied $$M_i<\lambda \quad (2)$$

wherein $M_i$ is the local ACMR for sub-sequence i, and λ is a threshold parameter. The parameter λ may be user-configured, pre-defined or pre-determined or automatically and potentially dynamically calculated. Example considerations for choosing the parameter λ are set forth below.

Soft boundaries are introduced to improve performance and reduce overdraw. Smaller sub-sequences, which have only recently paid the price of a complete cache flush, have a higher local ACMR $M_i$, and are therefore less likely to be broken off at soft boundaries. Higher values of λ allow even these sequences to be broken, and result in a greater number of clusters, at the cost of a stronger impact on the global ACMR. Conversely, lower values of λ reduce the number of soft boundaries, and thus affect the global ACMR to a lesser extent. In fact, λ is a close lower bound for the ACMR of the cluster model. For example, choosing λ<0.5 will eliminate soft boundaries and leave the ACMR unchanged. Any value λ≧3 will generate individual triangles as clusters, potentially ruining the ACMR.

Even before clustering, the ACMR can vary substantially between different models. It therefore makes sense to choose λ relative to the ACMR each model has right before clustering affects it. This bounds the penalty in vertex processing due to clustering. Empirical studies suggest that a relatively small markup (such as less than approximately 5%) in the value of λ results in a sufficient number of clusters, while incurring a small (such as approximately 5% to 10%) penalty in vertex processing.

The clustering step 320 also substantially reduces the number of elements to be sorted. In fact, the O(n log n) complexity is now for n clusters, not t triangles. As long as the average cluster size is greater than log t, the complexity is sub-linear on the number of triangles. In practice, this is always the case. For instance, even with a tiny average cluster size of 20 (which would likely harm the vertex cache performance), it would take a model with $t > 20*2^{20}$ triangles before n log n > t.

C. View-Independent Cluster Sorting

The view-independent sorting step 330 of technique 300 (FIG. 3) is now described in more detail.

To reduce overdraw in a view-independent way, surface points that are more likely to occlude other surface points, from any viewpoint, should be drawn first. This likelihood is captured by the occlusion potential integral O(p,M) of an oriented point p, relative to model M. It is defined as the area of M that can be occluded by point p, and is given by the following equation:

$$O(p, M) = \int_{q \in M} \frac{R(\langle p-q, n_p \rangle) R(\langle p-q, n_q \rangle)}{\langle p-q, p-q \rangle} dq \quad (3)$$

where $R(x)=(x+|x|)/2$ is the unit ramp function, $\langle,\rangle$ is the dot product, and $n_p$ and $n_q$ are the normals at points p and q, respectively.

Figure 7:
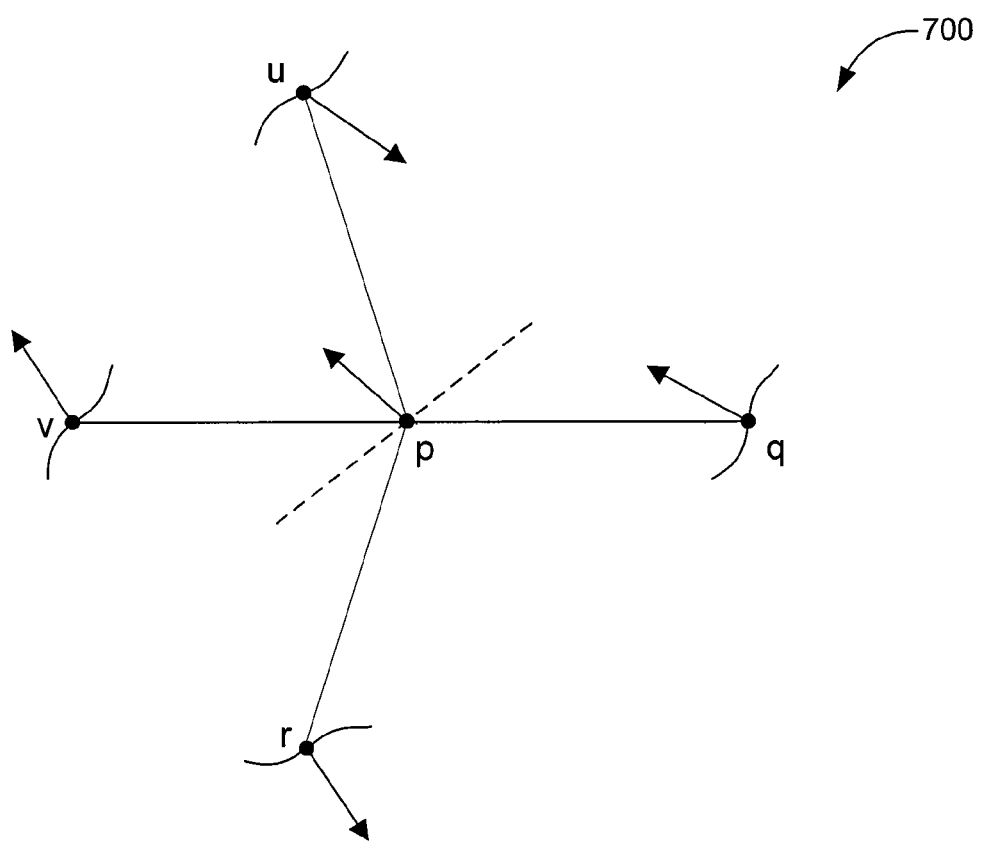
FIG. 7 depicts example vertices included in a mesh and their associated normals.

The integral in Equation (3) is explained with reference to FIG. 7. Referring to FIG. 7, a point p can only occlude a point q if neither of them is back-face culled when p is in front of q. In other words, $\langle p-q, n_p \rangle$ and $\langle p-q, n_q \rangle$ must both be positive in order for point p to occlude point q. In FIG. 7, points r, u, and v fail one or both these tests, and therefore do not contribute to p's occlusion potential. Point q passes both tests. In that case, the contribution reflects the foreshortening of both p and q, as seen by an orthographic camera. This is the role of the cosine terms arising from the dot products and normalized by the denominator.

Ideally, individual surface points should be sorted based on their occlusion potentials (points with higher potentials should be drawn first). However, to preserve the vertex cache optimization of step 310, step 330 sorts triangle clusters atomically. As a result, the definition of occlusion potential is extended to surface patches P, as follows:

$$O(P, M) = \int_{p \in P} O(p, M) dp \quad (4)$$

Unfortunately, computing the occlusion potential integral of Equation (3) takes $O(t^2)$ time, where t is the number of triangles in the mesh.

Instead, the view-independent sorting step 330 sorts the clusters based on a heuristic approximation that takes O(t) time to calculate. Intuitively, points with high occlusion potential will be on the outskirts of a model, and will be pointing away from it. With this intuitive insight, the approximate occlusion potential of a surface patch P with regard to model M is defined as follows:

$$O'(P,M)=(C(P)-C(M)) \cdot N(P) \quad (5)$$

where C is the centroid function, and N(P) represents the average normal of patch P. In an embodiment, the view-independent sorting step 330 sorts the clusters based on the approximate occlusion potential given in Equation (5).

In general, the value of the approximate occlusion potential given in Equation (5) will not be close to the value of the occlusion potential integral of Equation (3). In fact, the approximation occlusion potential can produce negative values. Nevertheless, the relative order of the values produced tend to be very similar.

IV. Example Software Implementations

Figure 8:
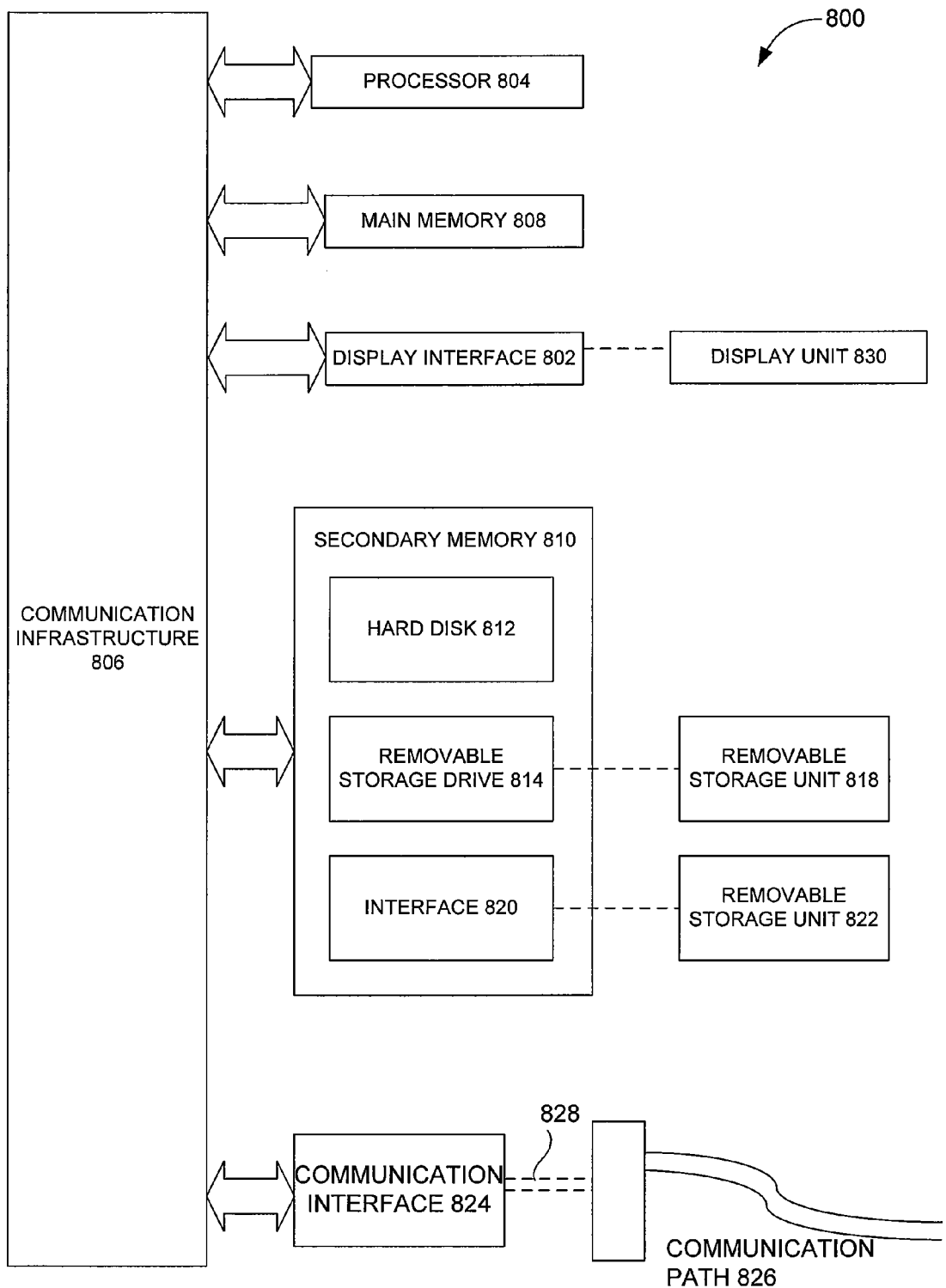
FIG. 8 depicts an example computer system in which an embodiment of the present invention may be implemented.

Embodiments of the present invention may be implemented using hardware, software or a combination thereof, and may be implemented in one or more computer systems or other processing systems. An embodiment is directed toward one or more computer systems capable of carrying out the functionality described herein, such as implementing a view-independent triangle reordering. An example of a computer system 800 is shown in FIG. 8.

The computer system 800 includes one or more processors, such as processor 804. Processor 804 may be a general purpose processor (such as, a CPU) or a special purpose processor (such as, a GPU). Processor 804 is connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 800 includes a display interface 802 that forwards graphics, text, and other data from communication infrastructure 806 (or from a frame buffer not shown) for display on display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. An embodiment of the invention is directed to such computer program products, such as computer program products for a view-independent triangle reordering as described herein.

Computer programs (also referred to as computer control logic) are stored in main memory 808 and/or secondary memory 810. Computer programs may also be received via communications interface 824. Such computer programs, when executed, enable the computer system 800 to perform features of the present invention, such as implementing a view-independent triangle reordering as discussed herein. In particular, the computer programs, when executed, enable the processor 804 to perform the features of the present invention, including the implementation of a view-independent triangle reordering as discussed herein. Accordingly, such computer programs represent controllers of the computer system 800.

In another embodiment, the invention is implemented primarily in hardware using, for example, hardware components such as GPUs. Implementation of the hardware state machine so as to perform the functions described herein will be apparent to persons skilled in the relevant art(s).

In yet another embodiment, the invention is implemented using a combination of both hardware and software.

In addition to hardware implementations of GPU 110, such GPUs may also be embodied in software disposed, for example, in a computer usable (e.g., readable) medium configured to store the software (e.g., a computer readable program code). The program code causes the enablement of embodiments of the present invention, including the following embodiments: (i) the functions of the systems and techniques disclosed herein (such as implementing a view-independent triangle reordering in accordance with an embodiment of the present invention); (ii) the fabrication of the systems and techniques disclosed herein (such as the fabrication of GPU 110); or (iii) a combination of the functions and fabrication of the systems and techniques disclosed herein.

For example, this can be accomplished through the use of general programming languages (such as C or C++), hardware description languages (HDL) including Verilog HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

Set forth above are example systems and methods that efficiently reorder triangles in a model to take advantage of graphics hardware optimizations during rendering. Such methods are faster than conventional methods for both vertex cache and overdraw optimization. While various embodiments of the present invention have been described above, it should be understood that they have been presented by way of example only, and not limitation. It will be apparent to persons skilled in the relevant art that various changes in form and detail can be made therein without departing from the spirit and scope of the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Thus, the breadth and scope of the present invention should not be limited by any of the above-described exemplary embodiments, but should be defined only in accordance with the following claims and their equivalents.

What is claimed is:

1. A computer-based method, implemented at runtime, to reduce overdraw during rendering of a mesh, comprising:
   reordering triangles of the mesh to reduce cache misses;
   grouping the reordered triangles into clusters; and
   reordering a sequence in which the clusters are rendered relative to each other based on a view-independent occlusion potential.

2. The computer-based method of claim 1, wherein computation of the view-independent occlusion potential is linear in time with respect to the number of triangles in the mesh.

3. The computer-based method of claim 1, wherein the grouping comprises:
   grouping a first plurality of the reordered triangles into a first cluster when there is a cache flush.

4. The computer-based method of claim 3, wherein the first cluster is broken into sub-clusters when an average cache miss ratio of the first cluster is less than a threshold.

5. A computer-based method for preprocessing a mesh to reduce overdraw during rendering of the mesh, comprising:
   reordering triangles of the mesh to reduce cache misses;
   grouping the reordered triangles into clusters;
   reordering a sequence in which the clusters are rendered relative to each other based on a view-independent occlusion potential; and
   encoding the order in a computer-usable medium.

6. The computer-based method of claim 5, wherein computation of the view-independent occlusion potential is linear in time with respect to the number of triangles in the mesh.

7. The computer-based method of claim 5, wherein the grouping comprises:
   grouping a first plurality of the reordered triangles into a first cluster when there is a cache flush.

8. The computer-based method of claim 7, wherein the first cluster is broken into sub-clusters when an average cache miss ratio of the first cluster is less than a threshold.

9. A computer-based method to reduce overdraw during rendering of a mesh, comprising:
   receiving a rendering sequence, wherein the rendering sequence is derived by (i) reordering triangles of the mesh to reduce cache misses,
(ii) grouping the reordered triangles into clusters;
(iii) reordering a sequence of the clusters relative to each other based on a view-independent occlusion potential; and
(iv) determining the rendering sequence for the clusters based on the reordered sequence; and
rendering the clusters according to the rendering sequence.

10. The computer-based method of claim 9, wherein computation of the view-independent occlusion potential is linear in time with respect to the number of triangles in the mesh.

11. The computer-based method of claim 9, wherein the grouping comprises:
grouping a first plurality of the reordered triangles into a first cluster when there is a cache flush.

12. The computer-based method of claim 11, wherein the first cluster is broken into sub-clusters when an average cache miss ratio of the first cluster is less than a predetermined value.

13. A computer program product comprising a non-transitory computer-readable storage medium having computer program logic recorded thereon for enabling a processor to render triangles of a mesh, the computer program logic comprising:
computer readable first program code to cause the processor to reorder the triangles to reduce cache misses;
computer readable second program code to cause the processor to group the reordered triangles into clusters, each cluster being generated on the occurrence of a vertex cache flush; and
computer readable third program code to cause the processor to reorder a sequence in which the clusters are rendered relative to each other according to a view-independent occlusion potential rendering sequence.

14. The computer program product of claim 13, wherein computation of the view-independent occlusion potential is linear in time with respect to the number of triangles in the mesh.

15. The computer program product of claim 13, wherein the processor comprises a central processing unit.

16. The computer program product of claim 13, wherein the processor comprises a graphics processing unit.

17. The computer program product of claim 13, wherein the computer readable second program code comprises:
code to group a first plurality of the reordered triangles into a first cluster a when there is a cache flush.

18. The computer program product of claim 17, wherein the computer readable second program code further comprises:
code to break the first cluster into sub-clusters when an average cache miss ratio of the first cluster is less than a predetermined value.

19. A method of displaying an image, comprising:
reordering a sequence in which clusters are rendered relative to each other based on a view-independent occlusion potential, wherein the clusters comprise groups of reordered triangles, the triangles being reordered to reduce cache misses; and
displaying the rendered clusters.

20. A system for displaying an image, comprising:
a graphics processing unit that reorders a sequence in which clusters are rendered relative to each other based on a view-independent occlusion potential, wherein the clusters comprise groups of reordered triangles, the triangles being reordered to reduce cache misses; and
a display, coupled to the graphics processing unit, that displays the rendered clusters.

* * * * *

UNITED STATES PATENT AND TRADEMARK OFFICE
CERTIFICATE OF CORRECTION

| | | |
|---|---|---|
| PATENT NO. | : 8,379,019 B2 | |
| APPLICATION NO. | : 11/964517 | |
| DATED | : February 19, 2013 | |
| INVENTOR(S) | : Barczak et al. | |

It is certified that error appears in the above-identified patent and that said Letters Patent is hereby corrected as shown below:

In the Claims:

Column 16

Line 12, please replace "cluster a when" with --cluster when--

Signed and Sealed this
Fourth Day of June, 2013

Teresa Stanek Rea
*Acting Director of the United States Patent and Trademark Office*